(12) United States Patent
Zhu

(10) Patent No.: US 9,454,847 B2
(45) Date of Patent: Sep. 27, 2016

(54) SYSTEM AND METHOD OF INDICATING TRANSITION BETWEEN STREET LEVEL IMAGES

(75) Inventor: Jiajun Zhu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1146 days.

(21) Appl. No.: 12/391,516

(22) Filed: Feb. 24, 2009

(65) Prior Publication Data
US 2010/0215250 A1    Aug. 26, 2010

(51) Int. Cl.
*G06F 17/30* (2006.01)
*G06T 19/00* (2011.01)
*G06T 17/05* (2011.01)
*G06T 15/20* (2011.01)

(52) U.S. Cl.
CPC .......... *G06T 19/00* (2013.01); *G06F 17/30241* (2013.01); *G06T 15/20* (2013.01); *G06T 17/05* (2013.01)

(58) Field of Classification Search
CPC ....... G06T 15/20; G06T 19/00; G06T 17/05; G06T 2207/10032; G06F 17/30241; G01C 21/26; G01C 21/3638
USPC .................................. 382/113; 345/422, 419
See application file for complete search history.

(56) References Cited

U.S. PATENT DOCUMENTS

| | | | |
|---|---|---|---|
| 5,460,239 A | 10/1995 | Jensen | |
| 5,490,239 A * | 2/1996 | Myers | 345/581 |
| 6,452,544 B1 | 9/2002 | Hakala et al. | |
| 6,504,535 B1 * | 1/2003 | Edmark | 345/419 |
| 6,628,283 B1 * | 9/2003 | Gardner | 345/427 |
| 6,700,578 B2 * | 3/2004 | Kamata et al. | 345/473 |
| 6,990,681 B2 | 1/2006 | Wang et al. | |
| 7,139,794 B2 * | 11/2006 | Levanon | G06F 3/14 345/420 |
| 7,199,793 B2 * | 4/2007 | Oh et al. | 345/419 |
| 7,221,364 B2 | 5/2007 | Matsumoto et al. | |
| 7,420,558 B2 * | 9/2008 | Urano et al. | 345/427 |
| 7,613,566 B1 | 11/2009 | Bolton | |

(Continued)

FOREIGN PATENT DOCUMENTS

| | | |
|---|---|---|
| CN | 1875613 A | 12/2006 |
| JP | 08500925 | 1/1996 |

(Continued)

OTHER PUBLICATIONS

Früh, Automated 3D Model Generation for Urban Environments [on-line], 2002 [retrieved Oct. 6, 2015], 177 total pages. Retrieved from the internet: https://portal.dnb.de/opac.htm?method=simpleSearch&cqlMode=true&query=idn%3D1006881212 URN: http://nbn-resolving.de/urn:nbn:de:swb:90-AAA32820037.*

(Continued)

*Primary Examiner* — Matthew Bella
*Assistant Examiner* — Dennis Rosario
(74) *Attorney, Agent, or Firm* — Lerner, David, Littenberg, Krumholz & Mentlik, LLP

(57) ABSTRACT

A system and method of displaying transitions between street level images is provided. In one aspect, the system and method creates a plurality of polygons that are both textured with images from a 2D street level image and associated with 3D positions, where the 3D positions correspond with the 3D positions of the objects contained in the image. These polygons, in turn, are rendered from different perspectives to convey the appearance of moving among the objects contained in the original image.

21 Claims, 16 Drawing Sheets

(56) References Cited

U.S. PATENT DOCUMENTS

| | | | |
|---|---|---|---|
| 8,893,026 B2 * | 11/2014 | Lindemann | G01C 11/02 348/36 |
| 2003/0038892 A1 | 2/2003 | Wang et al. | |
| 2003/0142115 A1 | 7/2003 | Endo et al. | |
| 2005/0081161 A1 | 4/2005 | MacInnes et al. | |
| 2006/0075442 A1 | 4/2006 | Meadow | |
| 2007/0124683 A1 | 5/2007 | Ranin et al. | |
| 2007/0198181 A1 | 8/2007 | Shimamura | |
| 2008/0016472 A1 * | 1/2008 | Rohlf | G06F 17/30241 715/848 |
| 2008/0186330 A1 | 8/2008 | Pendleton et al. | |
| 2008/0189031 A1 | 8/2008 | Meadow et al. | |
| 2009/0046093 A1 | 2/2009 | Kikuchi et al. | |
| 2009/0198767 A1 | 8/2009 | Jakobson et al. | |

FOREIGN PATENT DOCUMENTS

| | | |
|---|---|---|
| JP | 2000121360 A | 4/2000 |
| JP | 2001005994 A | 1/2001 |
| JP | 2006113857 A | 4/2006 |
| JP | 2008129093 A | 6/2008 |
| KR | 20070086037 A | 8/2007 |
| WO | 2006053271 A1 | 5/2006 |
| WO | 2008147561 A2 | 12/2008 |

OTHER PUBLICATIONS

PCT Notification of Transmittal of the International Saerch Report and the Written Opinion of the International Searching Autority, or The Declaration, Apr. 13, 2010, 12 pages.

Canadian Office Action for Canadian Patent Application No. 2753419 dated Jun. 18, 2013.

Chinese Office Action for Application No. 201080017715 dated Aug. 22, 2013.

Dictionary.com, http://dictionary.references.com/browse/stretch?s=t&path=/.

Canadian Office Action for Application No. 2753419 dated Jan. 24, 2014.

Japanese Office Action for Application No. 2011551307 dated Jan. 7, 2014.

Chinese Office Action for Application No. CN 201080017715.8 dated Feb. 28, 2015.

Korean Office Action for KR Patent Application No. 10-2011-7021785 dated Jan. 29, 2016.

* cited by examiner

SYSTEM AND METHOD OF INDICATING TRANSITION BETWEEN STREET LEVEL IMAGES

BACKGROUND OF THE INVENTION

Services such as Google Maps are capable of displaying street level images of geographic locations. These images, identified in Google Maps as "Street Views", typically comprise photographs of buildings and other features and allow a user to view a geographic location from a person's perspective as compared to a top-down map perspective.

The street level images tend to be taken at discrete locations. The Google Maps service provides a variety of mechanisms that allow a user to change from street level image at one location to another, such as clicking an arrow icon.

The Google Maps service also shows an animated transition between two street level images. For example, if the user indicates that he or she wants to move forward to the next image, the client computer is provided with instructions to zoom into the current street level. The zooming is intended to convey the impression of travelling into the image. Similarly, if the user moves to the next street level image, the currently-displayed image pans to the right or left, respectively.

The animation of the current street level image may be shown semi-transparently over the next street level image. More specifically, the next street level image is first sent in a low resolution JPEG format, and the current street level image moves across the low quality image while a higher resolution version of the next image is loaded. When the current street level image is finished moving or zooming, it is hidden from the user, at which point the second street level image is displayed.

If the server has access to street level images taken at locations between the geographic location of the current street level image and the location of the street level image to be displayed, the server may send these images to the client computer for display. While advantageous in many circumstances, many client computers lack a sufficiently fast connection to the server to receive and display the intervening images.

BRIEF SUMMARY OF THE INVENTION

One aspect of the invention provides a method of displaying an image. The method includes receiving a first image representing a geographic object captured by a camera at a first location; receiving object position data associated with the geographic location of the geographic object; determining, with a processor, a plurality of regions based on the first image and the object position data, each region being associated with a portion of the first image and a geographic location; generating, with a processor, a second image representing the geographic object from the perspective of a second location, the second image comprising a plurality of the regions displayed from the perspective of the second location; and displaying, on an electronic display, the second image.

Another aspect of the invention provides a method of displaying a street level image that includes receiving a first street level image of a geographic object captured by a camera at a first position, receiving depth data representing the position of surface of the geographic object with respect to the first position, generating, with a processor, a plurality of polygons where the vertices of the polygons are associated with positions, the positions of the vertices being determined based on the depth data, and where each polygon is further associated with a portion of the first street level image, and displaying, on an electronic display, a second street level image of the geographic object such that the street level image appears as if it were captured by a camera at the second position. The second street level image is calculated by a processor based on a second position, a plurality of the polygons, and the position of the polygons relative to the second position.

Yet another aspect of the invention relates to system that has a user input device as well as a memory that stores instructions, two-dimensional image data representing a street level image of geographic objects captured by a camera, and location data representing the three-dimensional location of the surfaces of the objects that are facing the camera. The system also includes a processor in communication with the user input device so as to process information received from the user input device in accordance with the instructions, as well as a display in communication with, and displaying information received from, the processor. The instructions include: receiving an identification of a second location and a second orientation; associating portions of the image data with different regions; determining surface location data for a plurality of points associated with each region, where the surface location data of a point represents the three-dimensional location of the portion of the surface of the object that is displayed in the image at the point, and where the surface location data is based on the location data; rendering a two-dimensional second image based on the image data of the regions, the surface location data for the regions, the second location and the second orientation; displaying the second image on the display.

Still another system displays images, and it includes a first computer at a first node of a network, the first computer comprising a first memory storing a first set of instructions, a first processor that processes data in accordance with the first set of instructions, and an electronic display. It also includes a second computer at a second node of a network, the second computer comprising a second memory storing a second set of instructions and a second processor that processes data in accordance with the second set of instructions. The second set of instructions comprise receiving a location from the first computer, transmitting a first image of geographic objects captured by a camera to the first computer, and transmitting position data defining the geographic location of the surfaces of the object represented in the image. The first set of instructions comprise: receiving the first image; receiving the position data; receiving a second location; for a plurality of portions of the image, associating each image portion with an image portion location, where the image portion location is calculated based on at least one geographic location of a surface represented by the portion; generating a second image from the image portions, where the position of each image portion within the second image is calculated based on the appearance of the image portion when viewed from the perceptive of the second location; and displaying the second image.

A further aspect of the invention relates to a method of providing a transition between street level images that includes: receiving a first street level image of geographic objects taken from a first geographic location; receiving object position data representing the geographic location of surfaces of the objects; requesting a second street level image, the second street level image being associated with a second geographic location; determining, with a processor, a plurality of polygons where each vertex of the polygon is associated with both a pixel position and a geographic location, the pixel position representing the position of the vertex relative to the first image, the geographic location of each vertex representing the geographic location of the portion of the object that is displayed at the pixel position of the vertex; determining a first intermediate geographic location based on the first geographic location and the second geographic location; determining, with a processor, a first intermediate image representing at least one of the geographic objects from the perspective of the first intermediate geographic location, the first intermediate image comprising a plurality of the polygons positioned within the first intermediate image based on the geographic location of each polygon's vertices relative to the first intermediate geographic location; and displaying the first intermediate image on a display.

DETAILED DESCRIPTION

In one aspect, the system and method determines the position of the surfaces of geographic objects displayed in a street level image, such as buildings, and uses this information to create an animation that conveys the impression of moving through the scene represented in the image. The animation may be generated entirely by a client computer, which uses the position information received from a server to create polygons that are textured with image information from the current street level image. The client computer may also calculate a series of intermediate geographic locations from the current street level image to the next street level image; these intermediate locations are used to render and display a series of two-dimensional views based on the polygons from these locations. This aspect of the system and method provides a great deal of flexibility for creating the impression of animated movement through the geographic objects shown in a street level image.

Figure 1:
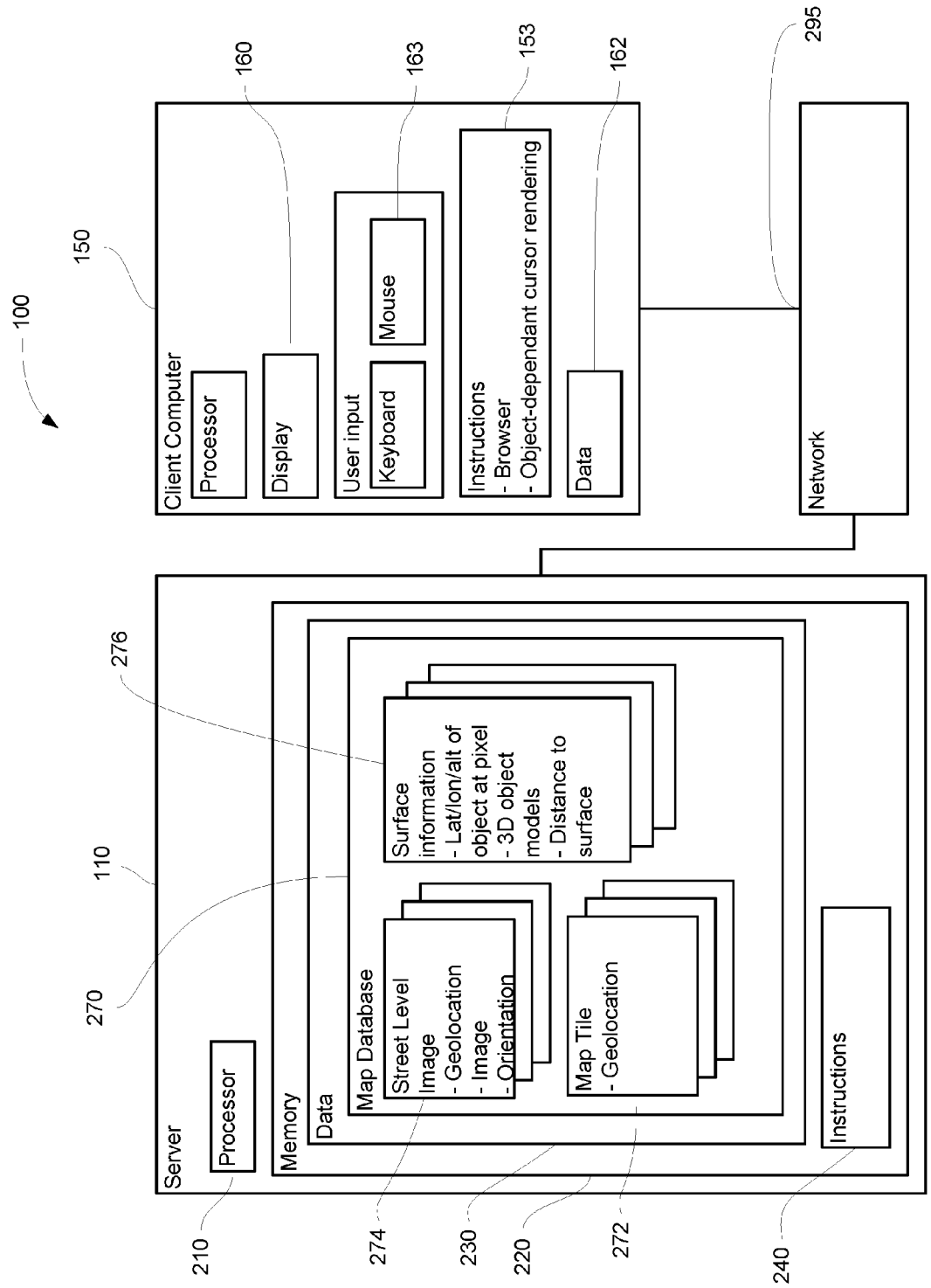
FIG. 1 is a functional diagram of a system in accordance with an aspect of the invention.
Figure 2:
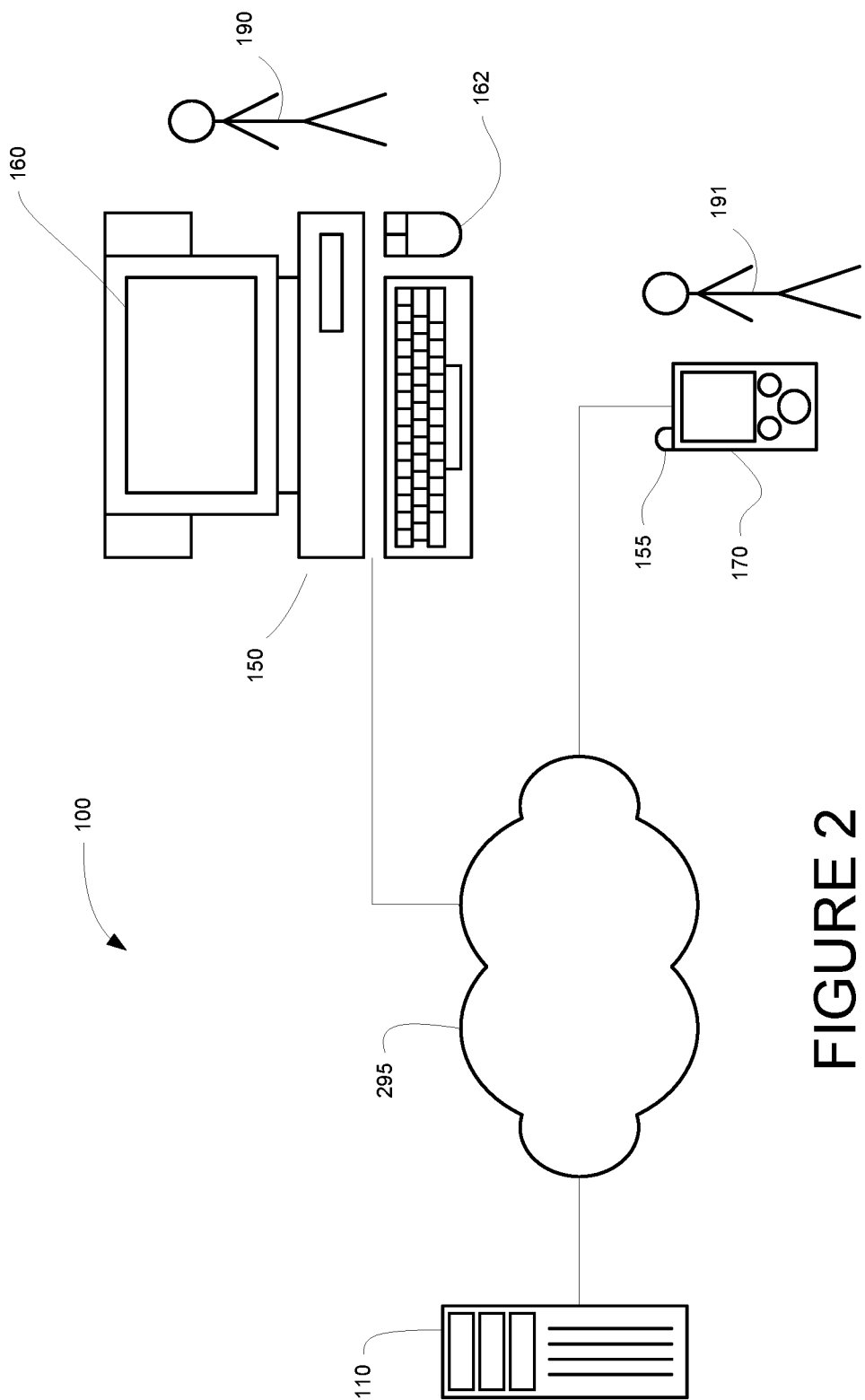
FIG. 2 is a pictorial diagram of a system in accordance with an aspect of the invention.

As shown in FIGS. 1-2, a system 100 in accordance with one aspect of the invention includes a computer 110 containing a processor 210, memory 220 and other components typically present in general purpose computers.

Memory 220 stores information accessible by processor 210, including instructions 240 that may be executed by the processor 210. It also includes data 230 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 210 may be any well-known processor, such as processors from Intel Corporation or AMD. Alternatively, the processor may be a dedicated controller such as an ASIC.

The instructions 240 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 230 may be retrieved, stored or modified by processor 210 in accordance with the instructions 240. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, computer 110 is a server communicating with one or more client computers 150, 170 (only client 150 being shown in FIG. 1 for clarity). For example, computer 110 may be a web server. Each client computer may be configured similarly to the server 110, with a processor, memory and instructions. Each client computer 150, 170 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input (for example, a mouse 163, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client computers 150 and 170 may comprise a full-sized personal computer, the system and method may also be used in connection with mobile devices capable of wirelessly exchanging data with a server over a network such as the Internet. For example, client computer 170 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA) or any other means of user input.

Client computers 150 and 170 may include a component, such as circuits, to determine the geographic location of the device. For example, mobile device 170 may include a GPS receiver 155. By way of further example, the component may include software for determining the position of the device based on other signals received at the mobile device 170, such as signals received at a cell phone's antenna from one or more cell phone towers if the mobile device is a cell phone.

The server 110 and client computers 150 and 170 are capable of direct and indirect communication, such as over a network 295. Although only a few computers are depicted in FIGS. 1-2, it should be appreciated that a typical system can include a large number of connected computers, with each different computer being at a different node of the network 295. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Map database 270 of server 110 stores map-related information, at least a portion of which may be transmitted to a client device. For example, map database 270 may store map tiles 272, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receipt of a geographical location.

As noted below, the locations may be expressed in various ways including but not limited to latitude/longitude positions, street addresses, points on a map (such as when a user clicks on a map), building names, other data capable of identifying one or more geographic locations, and ranges of the foregoing.

Figure 3:
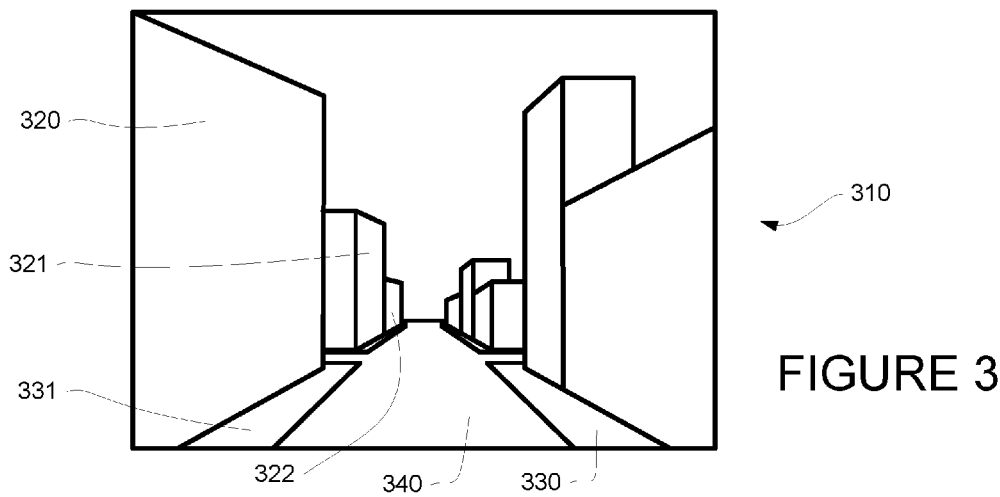
FIG. 3 is a street level image, captured by a camera, in accordance with an aspect of the invention.

The map database may also store street level images 274. Street level images comprise images of objects at geographic locations, captured by cameras at geographic locations, in a direction generally parallel to the ground. Thus, as shown in FIG. 3, street level image data may represent various geographic objects such as buildings 320-22, sidewalks 330-31 and street 340 from a perspective of a few feet above the ground and looking down the street. It will be understood that while street level image 310 only shows a few objects for ease of explanation, a typical street level image will contain as many objects associable with geographic locations (street lights, mountains, trees, bodies of water, vehicles, people, etc.) in as much detail as the camera was able to capture.

The street level image may be captured by a camera mounted on top of a vehicle, from a camera angle pointing roughly parallel to the ground and from a camera position at or below the legal limit for vehicle heights (e.g., 7-14 feet). Street level images are not limited to any particular height above the ground, for example, a street level image may be taken from the top of building. Panoramic street-level images may be created by stitching together a plurality of photographs taken from different camera angles.

Figure 4:
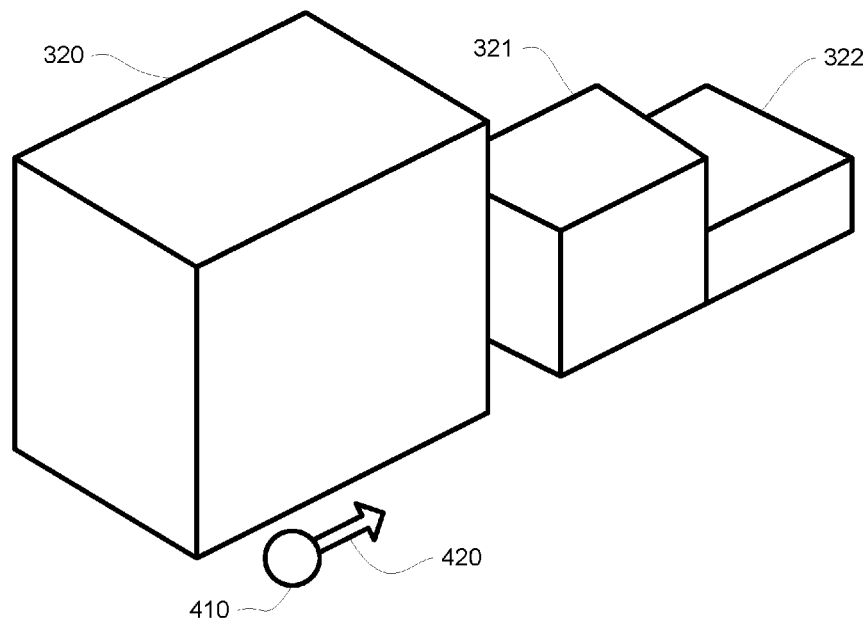
FIG. 4 is a diagram functionally illustrating, in accordance with an aspect of the invention, the relative geographic positions of objects within a street level image and the position and angle of a camera used to capture the street level image.

FIG. 4 pictorially illustrates the locations of the buildings 320-21 relative to the position 410 and angle 420 of the camera when the image was captured.

Each street level image may be stored as a set of pixels associated with color and brightness values. For example, if the images are stored in JPEG format, the image will be displayed as a set of pixels in rows and columns, with each pixel being associated with a value that defines the color and brightness of the image at the pixel's location.

In addition to being associated with geographic locations, street level images 274 are typically associated with information indicating the orientation of the image. For example, if the street level image comprises a typical photograph, the orientation may simply be the camera angle, which in turn may be represented as an angle that is 30° east of true north and rises 2° from ground level. If the street level images are panoramic images, such as 360° panoramas centered at the geographic location associated with the image, the orientation may indicate the portion of the image corresponding with looking due North from the camera position at an angle directly parallel to the ground.

Street level images may also be stored in the form of videos, such as by displaying MPEG videos captured by an analog video camera or displaying, in succession, time-sequenced photographs that were captured by a digital still camera.

Memory 220 also stores object position data representing the geographic position of the geographic objects in the street level images. The object position data may be stored in any number of formats. (The terms "location" and "position" are used interchangeably herein.)

Figure 5:
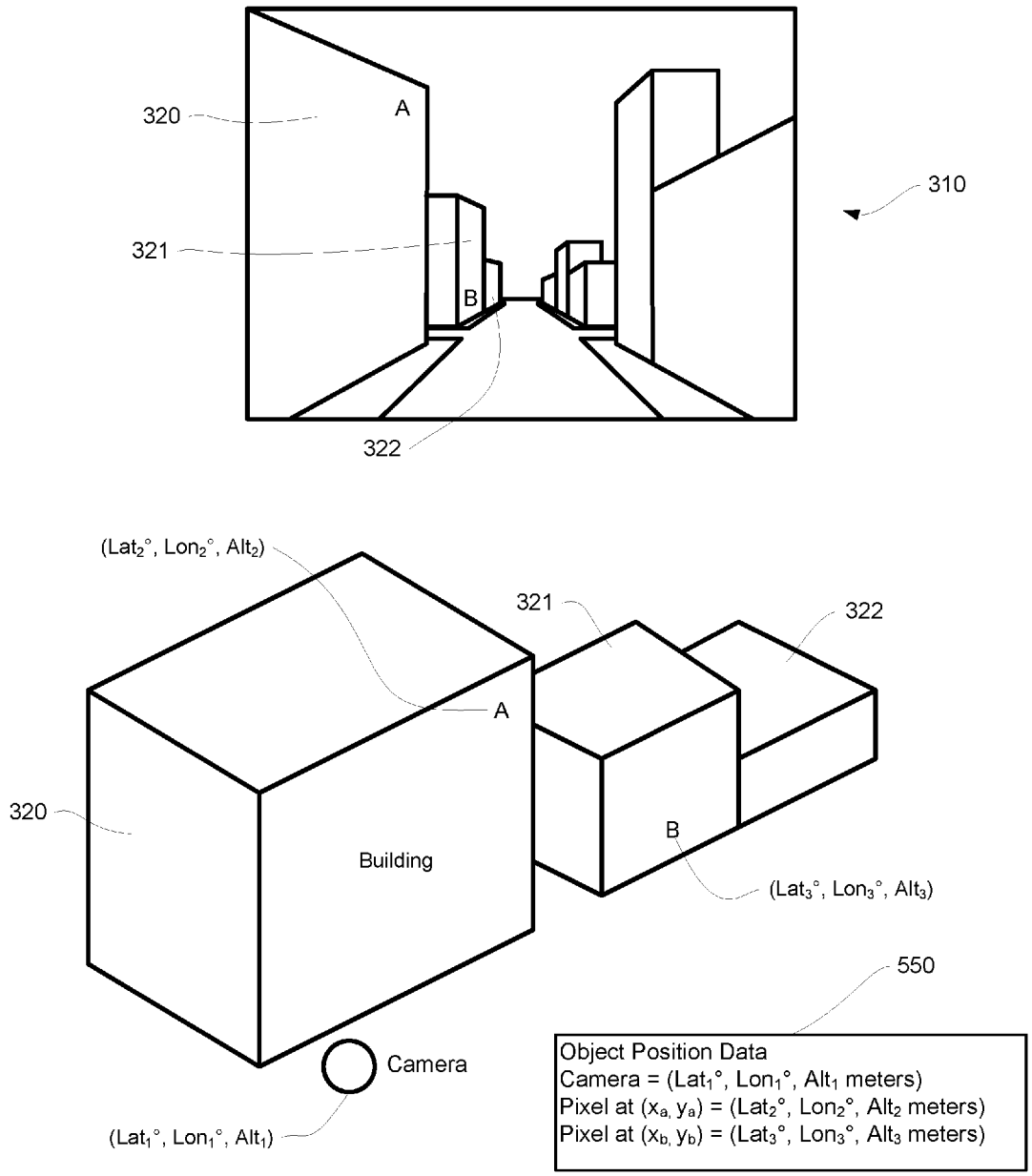
FIG. 5 is a street level image, a functional diagram of the geographic positions of objects within the street level image relative to a camera position, and object position data in accordance with an aspect of the invention.

In one aspect, the object position data stores values representing the geographic positions of the surfaces facing the camera. In that regard, a separate value may be stored for each pixel of the street level image where the value represents the geographic position of the surface that is illustrated at that pixel. Thus, as shown in FIG. 5, the pixel at row $y_a$ and column $x_a$ (hereafter, "$(x_a, y_a)$") of the street level image 510 represents a portion of the surface of building 320 at point "A". The pixel is associated with two values, the first value being the color and brightness of that portion of the surface as captured by the camera.

The second value associated with the pixel is the geographic location of that portion of the surface. For example, the value may reflect the portion's latitude/longitude and altitude position and expressed as a coordinate of the form $(Lat_2°, Lon_2°, Alt_2$ meters$)$. The geographic location of the portion of building 322 shown at the pixel at position "B" may be similarly represented as $(Lat_3, Lon_3, Alt_3)$. The object position data 550 may also store the geographic location of the camera position as $(Lat_1, Lon_1, Alt_1)$. Pixels that are not associated with a surface may be associated with a null or default surface value.

Figure 6:
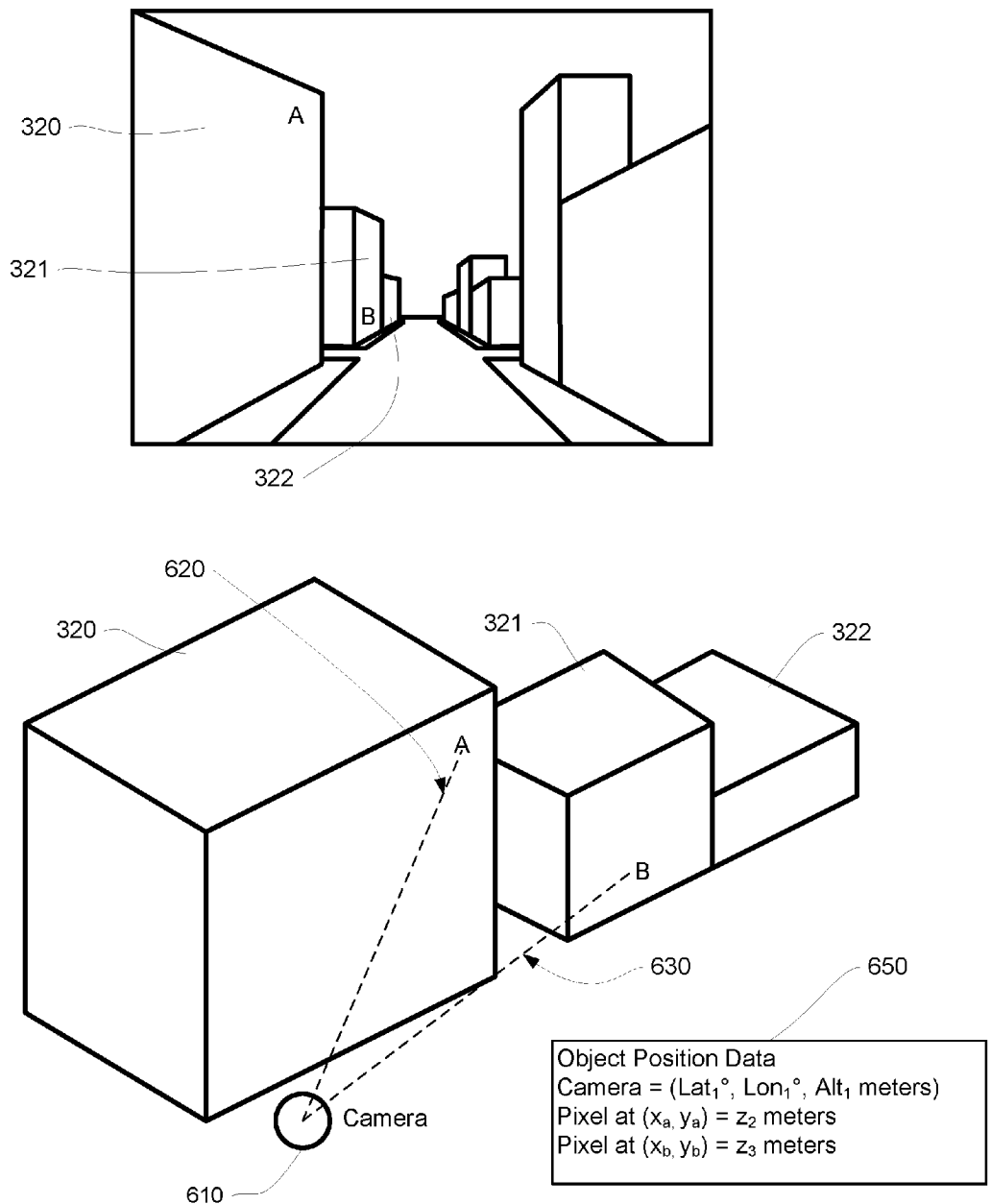
FIG. 6 is a street level image, a functional diagram of the geographic positions of objects within the street level image relative to a camera position, and object position data in accordance with an aspect of the invention.

In still another aspect, the object position data may store the distances from the objects to the camera at each pixel of the image. Thus, as shown in FIG. 6, the object position data 650 may define the distance 620 from the camera position 610 to the surface of building 320 at pixel "A". Similarly, the object position data may define the distance 630 from the camera position 610 to the surface of building 320 at pixel "B".

Figure 7:
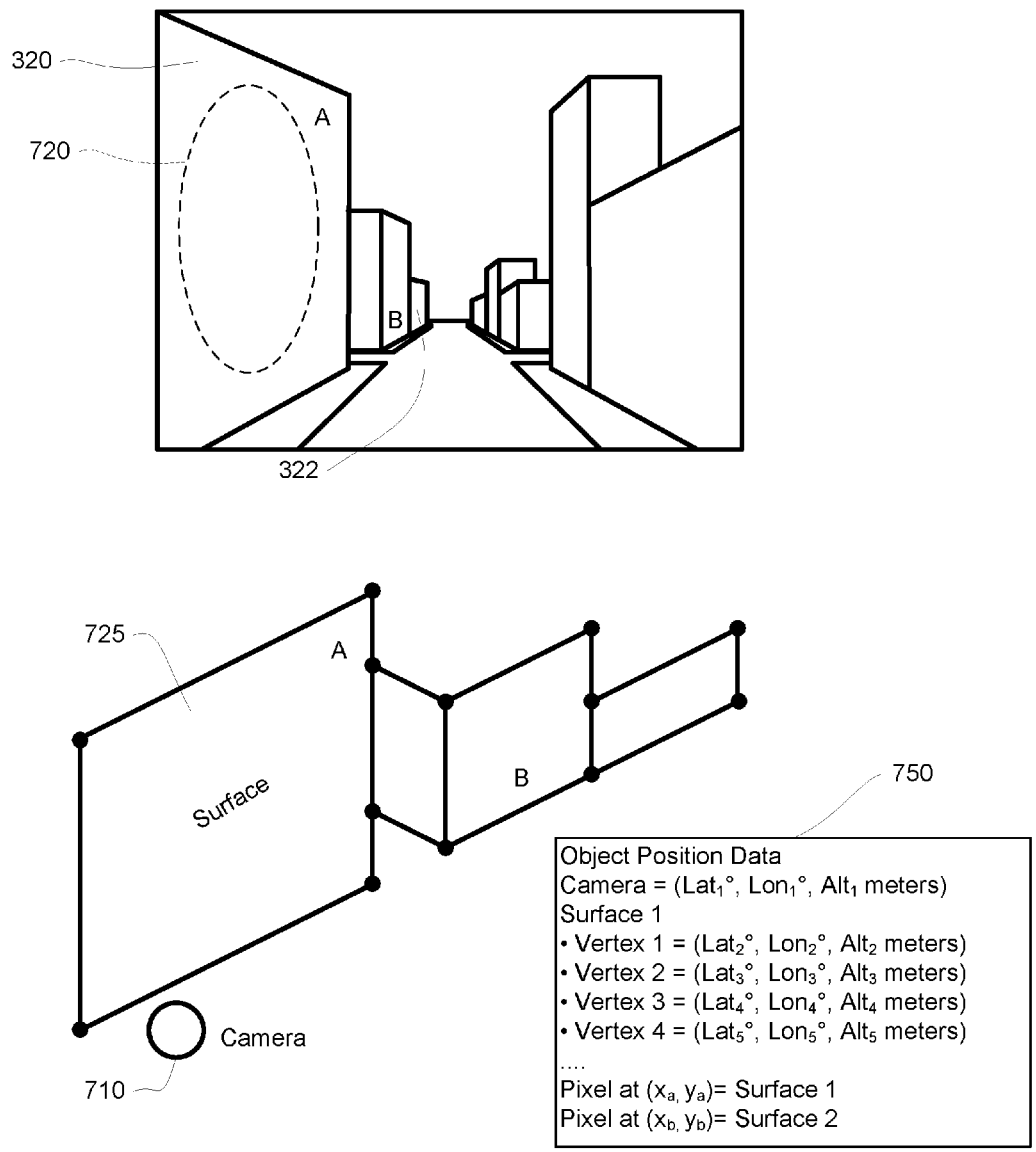
FIG. 7 is a street level image, a functional diagram of the geographic positions of objects within the street level image relative to a camera position, and object position data in accordance with an aspect of the invention.

In another aspect, the geographic locations of the surfaces facing the camera are stored as polygons. Thus, as shown in FIG. 7, the surface 720 of building 320 that faces the camera may be defined as a polygon 725 having four vertices, each vertex being associated with a different geographic location. For example, the surface may be referenced in object position data 750 as a set of vertices at positions $(Lat_2, Lon_2, Alt_2)$, $(Lat_3, Lon_3, Alt_3)$, $(Lat_4, Lon_4, Alt_4)$ and $(Lat_5, Lon_5, Alt_5)$. The surfaces of the other objects may be similarly stored along the location of the camera. The object position data may further define, for each pixel in the image, the surface that corresponds with the pixel. For example, the object position data for the pixel at position "A" may reference polygon 725.

Other formats for storing the object position data may also be used. For example, rather than being associated with absolute values such as latitude/longitude, the values may be relative and in any scale. Moreover, even if a first type of information is used (such as storing the latitude, longitude and altitude of the camera and surface), information of another type may be generated from it (such as using differences between latitude/longitude positions and altitudes to calculate distances).

Certain formats permit the surface information to be stored independently of the street level images taken by the camera. For example, object position data stored as described in FIG. 7 may be stored without reference to the street level image or camera position and may be retrieved by searching for surfaces having geographic locations near the location of the street level image.

A variety of systems and methods may be used to collect the surface information. By way of example only, a laser range finder may be used. In addition, stereoscopic systems employing two video cameras, spaced slightly apart yet looking at the same scene, may be used as well; by analyzing the slight differences between the images seen by each camera, it is possible to estimate the distance at each point in the images. In yet another aspect, the information may be compiled by using a single video camera, travelling at a particular velocity, to capture the street level imagery as the scenery passes by. The video may not only be used as the street level image, but subsequent frames may be compared to extract the different distances between the objects and the camera (e.g., mountains in the distance will stay in the frame much longer than a fire hydrant passing by along the street).

Figure 17:
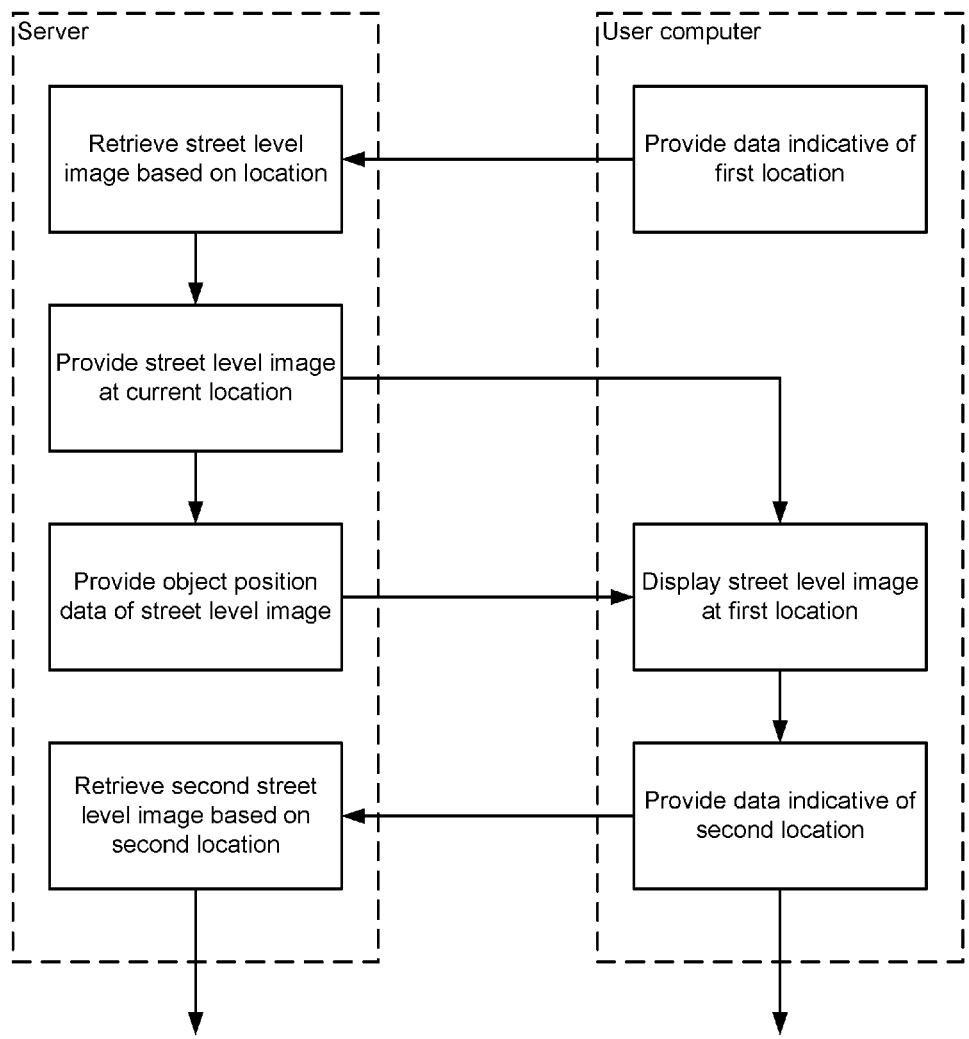
FIG. 17 is a flowchart in accordance with an aspect of the invention.
Figure 18:
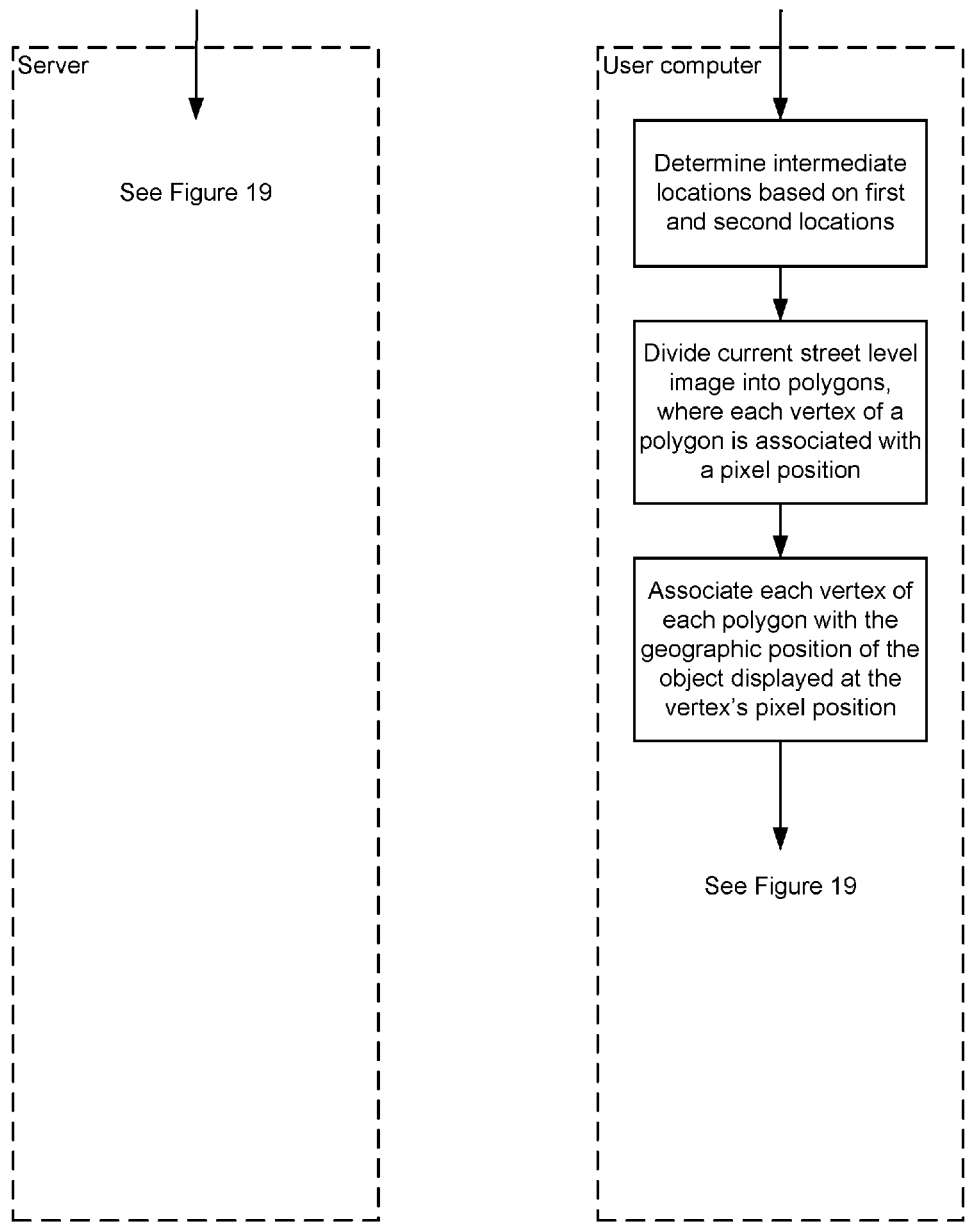
FIG. 18 is a flowchart in accordance with an aspect of the invention.
Figure 19:
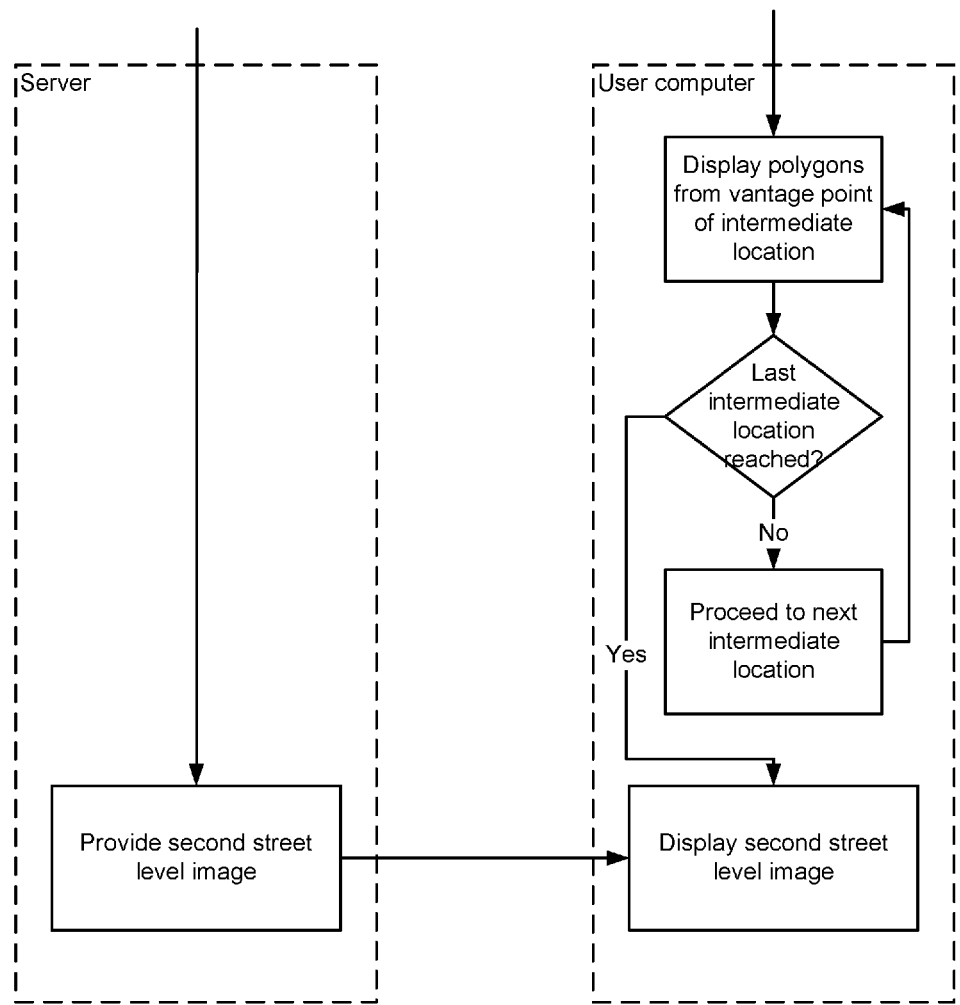
FIG. 19 is a flowchart in accordance with an aspect of the invention.

In addition to the operations illustrated in FIGS. 17-19, various operations in accordance with a variety of aspects of the invention will now be described. It should be understood that the following operations do not have to be performed in the precise order described below. Rather, various steps can be handled in reverse order or simultaneously.

Figure 8:
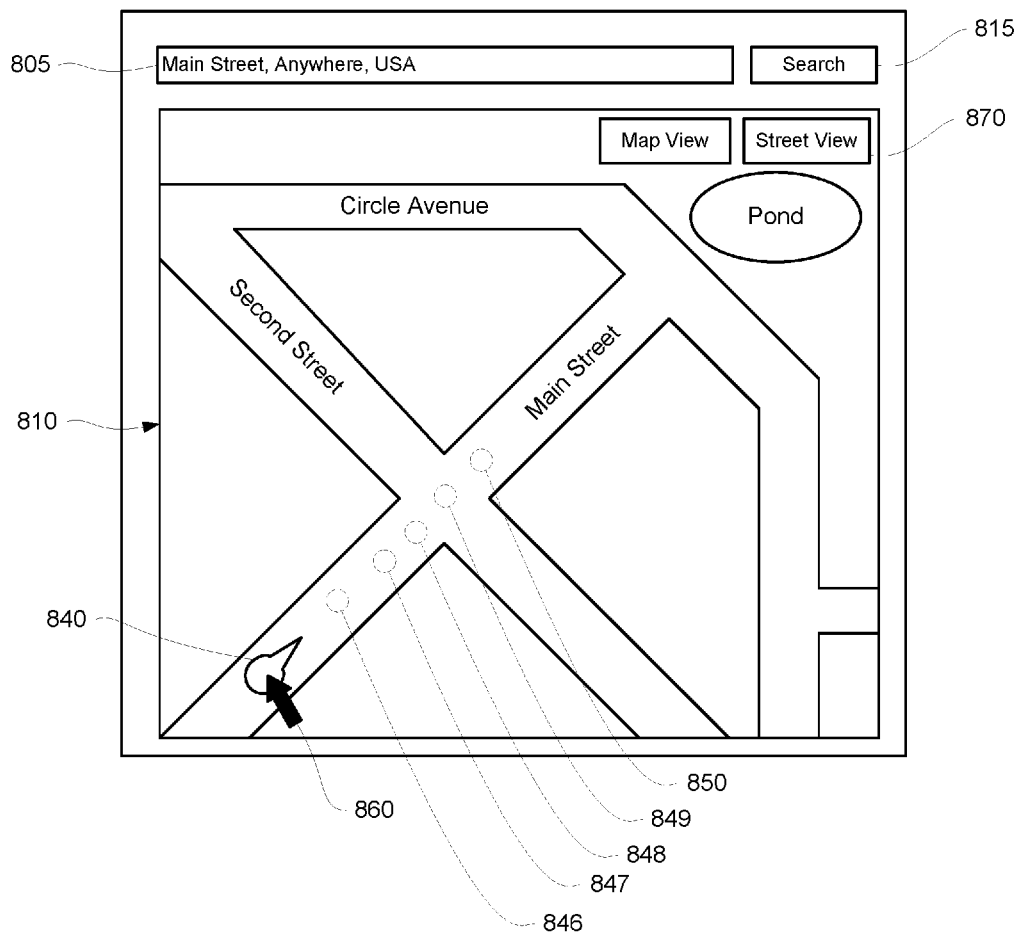
FIG. 8 is a screen shot in accordance with an aspect of the invention.

FIG. 8 illustrates a screen shot that may be displayed by the client computer's display device. For example, the system and method may be implemented in connection with an Internet browser such as Google Chrome (not shown) displaying a web page showing a map 810 and other information. The program may provide the user with a great deal of flexibility when it comes to requesting a location to be shown in a street level view. For example, the user may enter text identifying a location in textbox 805 such as an address, the name of a building, or a latitude and longitude. The user may then transmit the location to the server by selecting search button 815. The user may further use a mouse or keypad to move a mouse cursor 860 to identify a particular geographical location on the map. Yet further, the program may provide a button 870 or some other feature that allows a user to request a street level view at the specified geographical location.

When requesting a street level image, the map may indicate the location and orientation of the camera position with a street viewpoint cursor 890.

Server 110 retrieves the appropriate street level image based on the requested location. For example, if the street level images are associated with the latitude/longitude coordinates of the camera when it captured the image, the server may retrieve the closest image to the requested latitude/longitude.

Figure 9:
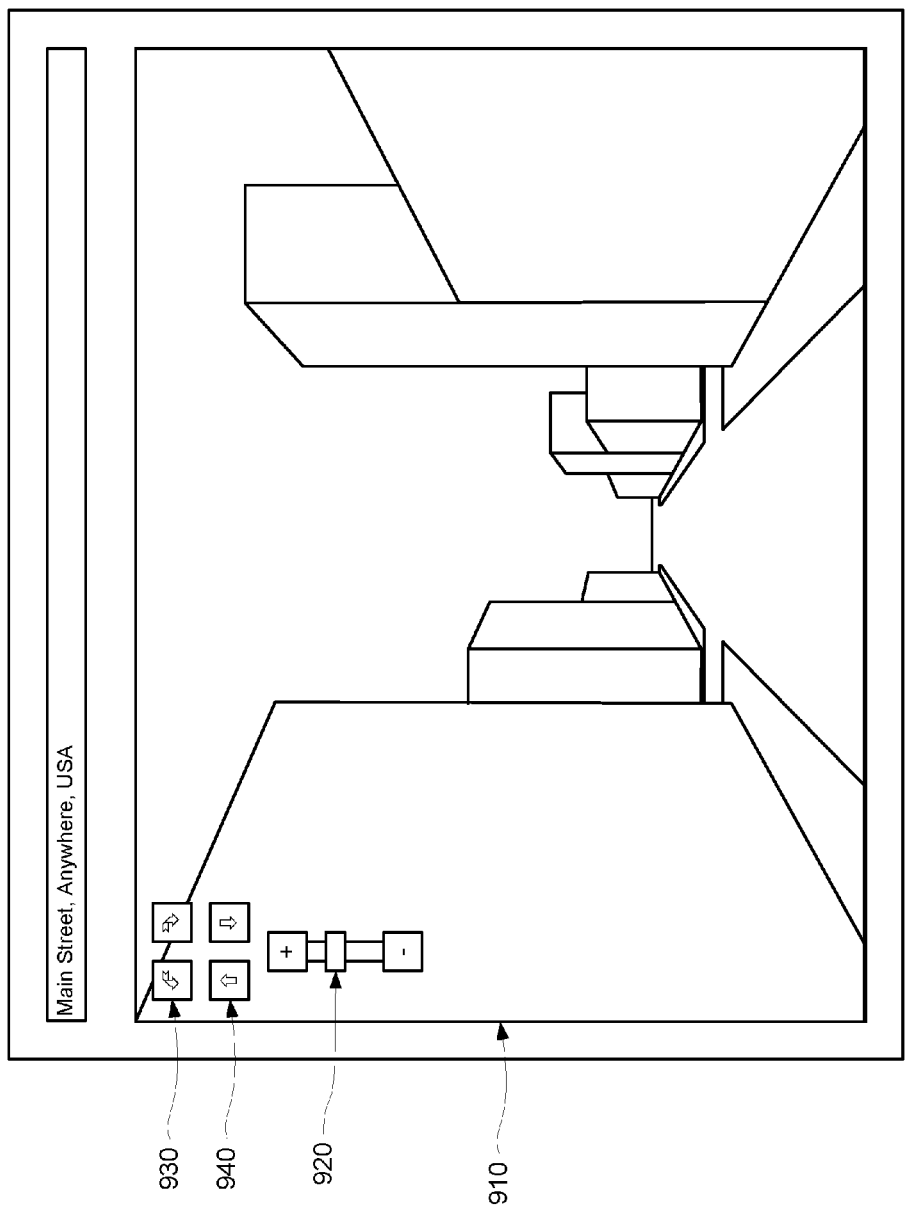
FIG. 9 is a screen shot in accordance with an aspect of the invention.

As shown in FIG. 9, the street level image 910 may be shown in the browser along with user-selectable controls for changing the location or orientation of the viewpoint. The controls may include controls 920 for zooming the image in and out, as well as controls 930 to change the orientation of the view, such as changing the direction from looking northeast to looking northwest. If the street level image was downloaded as an entire 360° panorama, changing the direction of the view may necessitate only displaying a different portion of the panorama without retrieving more information from the server.

The user may also change the location of the viewpoint. For example, the user may move the viewpoint forwards or backwards in the currently-viewed direction by selecting controls 940.

Other navigation controls may be included as well, such as controls in the form of arrows disposed along a street that may be selected to move the vantage point up or down the street. A user may also operate the arrow controls of a keyboard to change the zoom, direction or location of the view. A user may further select portions of the image, such as by moving and clicking a computer mouse or tapping a touch-sensitive screen, to select and move closer to the objects displayed in the image.

Depending on the street level image data that was downloaded, a change in location may necessitate the client computer obtaining more street level image data from the server. For example, and referring to both FIGS. 8 and 9, the street level image 910 may correspond with the location and northeast direction represented by street viewpoint cursor 840. If the user selects controls 940 to move the location forward, the closest street level image in the northeast direction may be located at position 850. Accordingly, the user's selection of a change of location will download the street level image associated with location 850.

The system and method uses the currently retrieved street level image to show an animation that conveys the impression of moving through the scene to the next street level image.

In this aspect, the client computer uses information relating to the location of the street level image's objects in three-dimensional space along with the visual appearance of the objects shown in the street level image.

Before the client computer displays the new street level image, its processor determines a series of intermediate images to display. The intermediate images reflect intermediate viewpoints between the current street level image and the next street level image.

For example, assume the user is moving from a street level image at location 840 to another street level image at location 850 as reflected in FIG. 8. The processor may calculate a number of intermediate locations from which to show images. The first intermediate image shown to the user may be generated from the vantage point at location 846, e.g., a portion of the way to the location of the next street level image at 850. The next intermediate image is generated with respect to a location 847 that is even closer to the location 850. The third and fourth intermediate images are generated based on locations 848 and 849, with location 849 being the last location shown prior to location 850.

Before the first intermediate image is displayed, the object position data is retrieved for the currently displayed street level image. This object position data may have been retrieved with the street level image.

Figure 10:
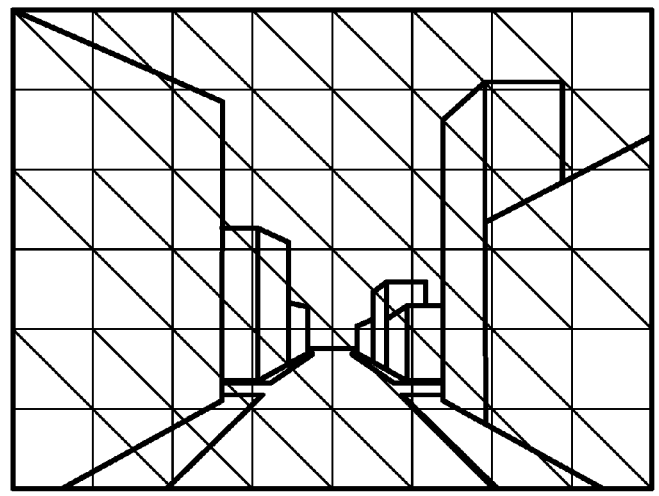
FIG. 10 illustrates the association of regions with a street level image in accordance with an aspect of the invention.

The processor analyzes individual portions of the street level image, and associates the portions with both image data and the geographic position of objects displayed in the image. For example, as shown in FIG. 10 and in one aspect of the system and method, the street level image (shown as thick lines) is effectively divided into triangles (such as thin lines). Although one aspect of the system and method uses non-overlapping triangles, it will be understood that other shapes, overlapping or not, may also be used.

Figure 11:
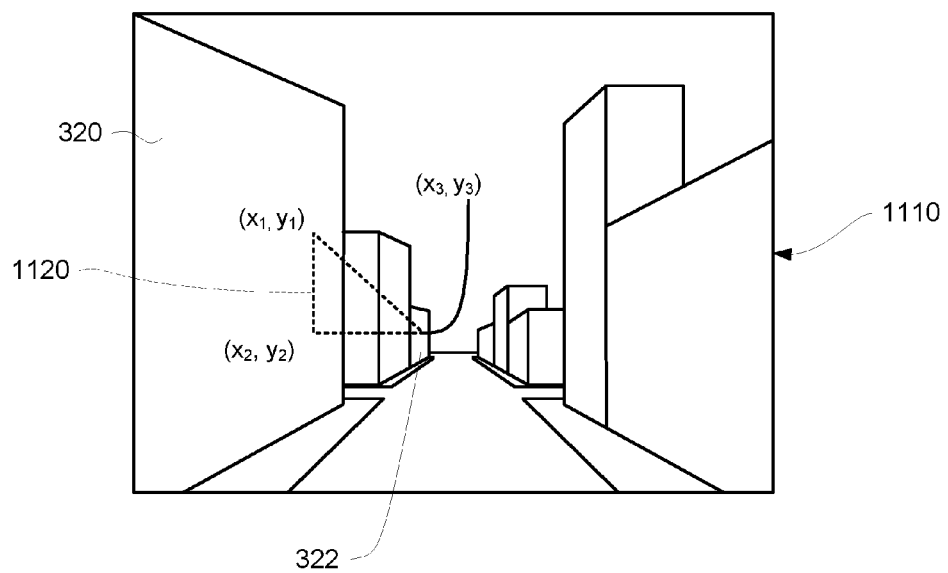
FIG. 11 illustrates the position of a region within a street level image in accordance with an aspect of the invention.

FIG. 11 shows how the process may be applied to a single region. Region 1120 defines a triangular region of pixels on street level image 1110. The vertices of the region, in terms of pixel positions within the image 1110, are referenced as $(x_1, y_1)$, $(x_2, y_2)$ and $(x_3, y_3)$.

Because the image represents geographic objects, the pixels represent the color and brightness of the geographic objects in the image. In other words, the pixel at $(x_1, y_1)$ defines the color and brightness of one portion of building 320, the pixel at $(x_2, y_2)$ defines the color and brightness at another portion of building 320, and the pixel at $(x_3, y_3)$ defines the color and brightness of a portion of building 322. The other pixels within the region 1120 similarly define the appearance of geographic objects within the region.

Because each pixel in the region 1120 is associated with a geographic object, the pixels are also associated with geographic locations in three-dimensional space.

Figure 12:
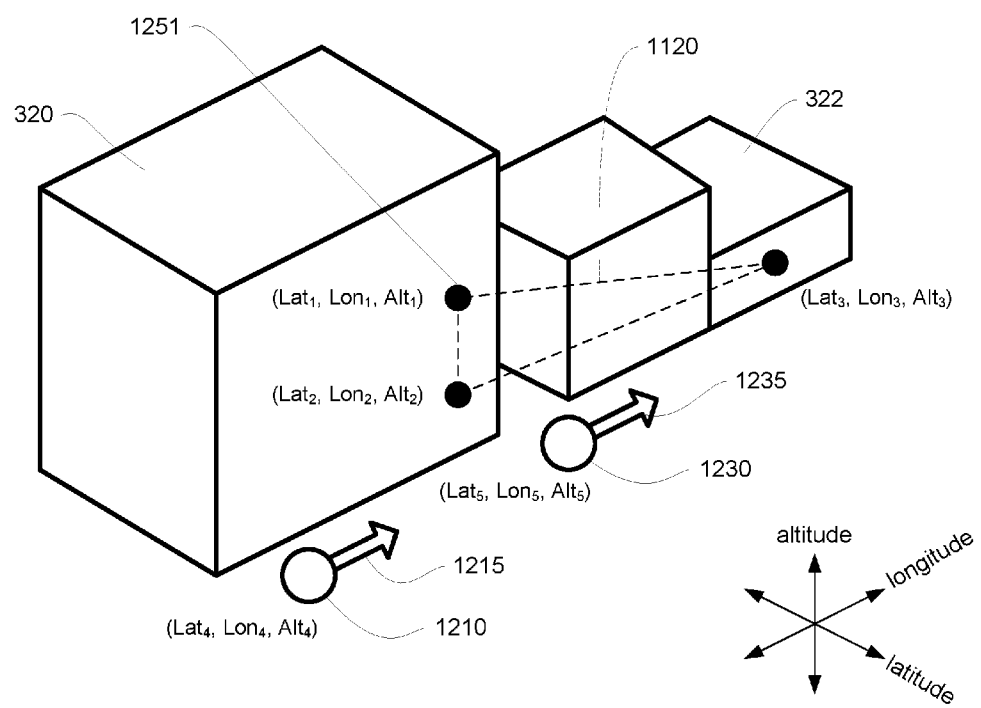
FIG. 12 illustrates the position of a region relative to the geographic positions of objects within a street level image and different vantage points, all in accordance with an aspect of the invention.

FIG. 12 diagrammatically illustrates the relationship between the pixels in the region and their relationship to the geographic locations of objects. The pixel 1251 at $(x_1, y_1)$ in the image 1110 displays a portion of building 320, namely the portion of the building's surface at the geographic location $(Lat_1, Lon_1, Alt_1)$. The pixels $(x_2, y_2)$ and $(x_3, y_3)$ in image 1110 similarly correspond with geographic locations $(Lat_2, Lon_2, Alt_2)$ and $(Lat_3, Lon_3, Alt_3)$ on the surfaces of buildings 320 and 322, respectively. Thus, each pixel within region 1120 is associated with both an image pixel (FIG. 11) and a geographic position (FIG. 12).

FIG. 12 also diagrammatically illustrates the position 1210 and orientation 1215 of the camera when the street level image 1110 was taken, as well as the geographic location 1230 and orientation 1235 of an intermediate location (which corresponds with intermediate location 846 referenced in FIG. 8).

The geographic locations of the vertices may be determined from the object position data. For example, if the object position data was pre-calculated by the server and transmitted in the format as described in connection with FIG. 5, the geographic locations associated with the vertices may be quickly accessed based solely on the pixel position of the vertex.

This process is repeated for each region of the image, such as each triangular region shown in FIG. 10.

The client computer uses the regions to render a new street level image from the first intermediate location. For example, as shown in FIG. 12, region 1120 may be displayed from the vantage point of intermediate location 1230 and in the direction of arrow 1235. Because the 3D position of the region is known (such as its latitude/longitude and altitude) as well as its image (such as the pixels contained in the region), the region may be rendered in a 2D image based on any 3D camera position and angle using image processing techniques known to those of ordinary skill in the art.

For example, the data representing the regions may be structured as polygons, where each polygon is textured with its respective portion of the street level image, and where the coordinates of the vertices of the polygons correspond with the vertices' geographic locations. The 2D projection relative to the screen of the 3D coordinates may be computed using standard camera projections. Moreover, affirm transformation may be used for the texture mapping to approximate the perspective transformation in 3D space. The textured polygons may be provided to a browser plug-in that supports 3D rendering along with instructions to display the polygons from a camera position having coordinates that correspond with the first intermediate location.

The resultant intermediate image is then displayed on the client computer. For example, the street level image—now seen from the vantage point of an intermediate location—may be displayed in a web browser on the client computer.

Figure 13:
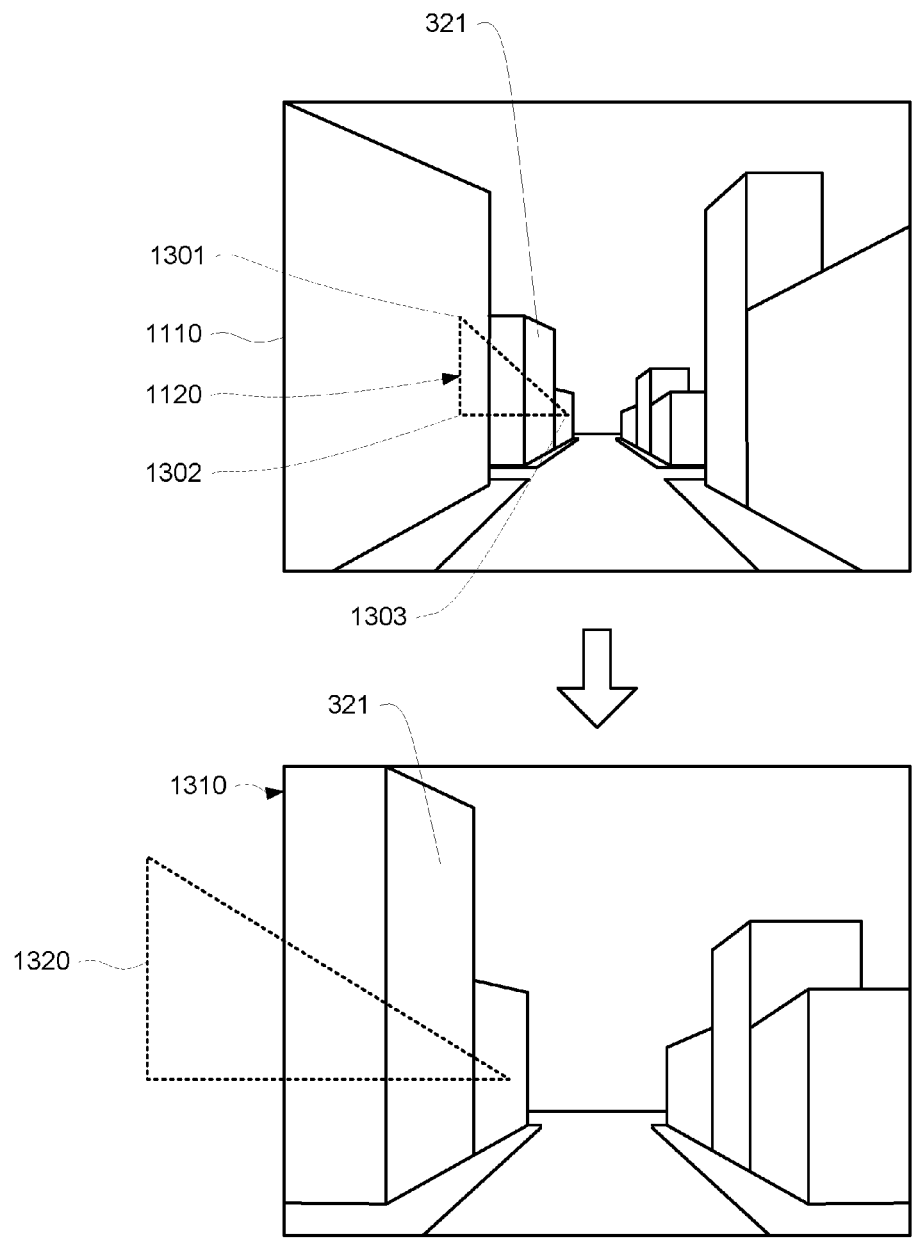
FIG. 13 compares a street level image with an intermediate street level image generated from it, in accordance with an aspect of the invention.

FIG. 13 illustrates the effect of redrawing the regions from the vantage point of an intermediate location. Street level image 1110 represents the original image that was retrieved from the server, displayed to the user, and used to compute the intermediate images. The client computer's processor defined triangular region 1120, determined the region's image information based on the visual information contained in the region 1120, and determined the region's position in 3D space based on the geographic position of the objects at the three vertices 1301, 1302 and 1303. Street level image 1310 is an intermediate image generated by processing regions such as region 1120. In that regard, triangular region 1320 contains relatively the same image data as triangular region 1120. However, the new viewpoint (e.g., intermediate location 846 shown in FIG. 8) has effectively stretched and moved the region to different pixel locations in the new image 1310 (relative to the old image 1110).

As also shown in FIG. 13, the intermediate image displays at least one of the geographic objects, such as building 321, that was in the original image. However, the geographic object is now displayed from a different vantage point.

Figure 14:
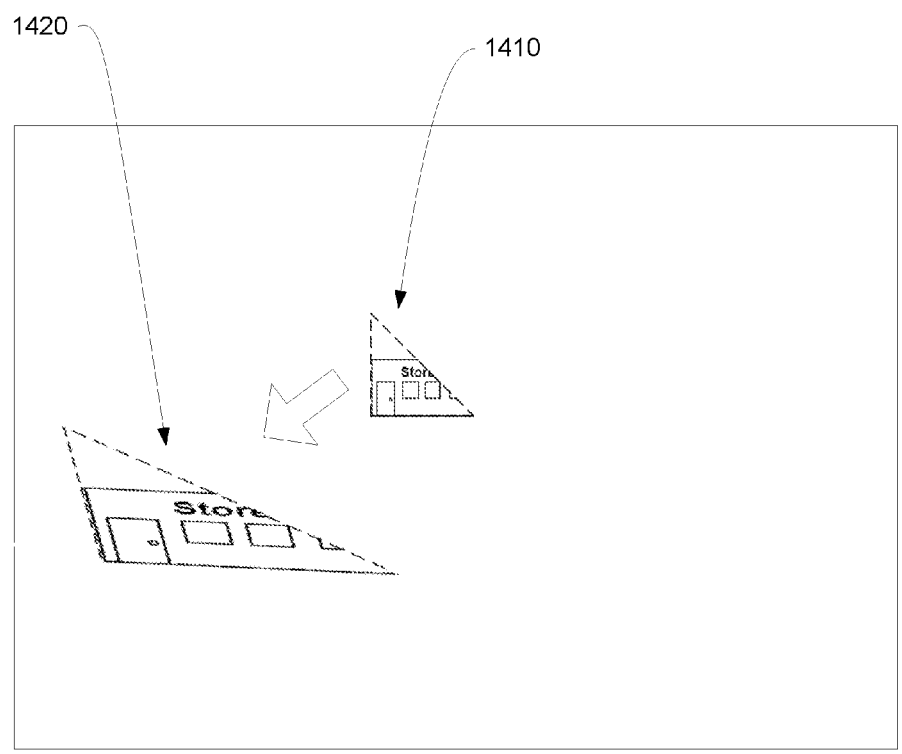
FIG. 14 illustrates the pixel position of a region in a street level image and an intermediate street level image in accordance with an aspect of the invention.

FIG. 14 also illustrates how a region may be effectively stretched and moved within an image based on a new vantage point. The triangular region includes pixels showing a store. The region was at pixel position 1410 relative to the bounds of the street level image. When the triangular region is drawn from a new viewpoint, the region may be stretched and translated to a new pixel position 1420 that is different from its original pixel position 1410.

After the first intermediate image is displayed, an intermediate image associated with a second intermediate location may also be displayed. In one aspect of the invention, the same regions may be used to render the second and subsequent intermediate images. For example, having already structured the regions as textured polygons positioned within a 3D space, the client computer may simply redraw the polygons from a vantage point that corresponds with the second intermediate location.

Each of the images calculated for the intermediate locations may also be shown in sequence. Thus, as shown in FIG. 8, generating and displaying images, in sequence, for locations 846-49 creates an animation that conveys the appearance of travelling among the objects represented in the street level image captured at location 840.

Any number of intermediate images may be generated and displayed in series, either as fast as such images may be generated or as slow as may be desired. Typically, the animation looks smoother when many images are shown in rapid succession, rather than showing a few images with long pauses between them.

The intermediate images are displayed until the last intermediate location is reached, which is typically the intermediate location that is closest to the geographic location of the next street level image to be displayed. After the last intermediate location is displayed, the street level image retrieved of the server is displayed.

In one aspect of the invention, the client computer generates and displays the intermediate images while the server retrieves the next street level image and transmits it to the client computer. This has the added advantage of giving the user something interesting to watch while the image is loading. Moreover, the number of intermediate images, and the duration of time between displays of individual intermediate images, may be calculated to coincide with the estimated time to load and display the next street level image.

Figure 15:
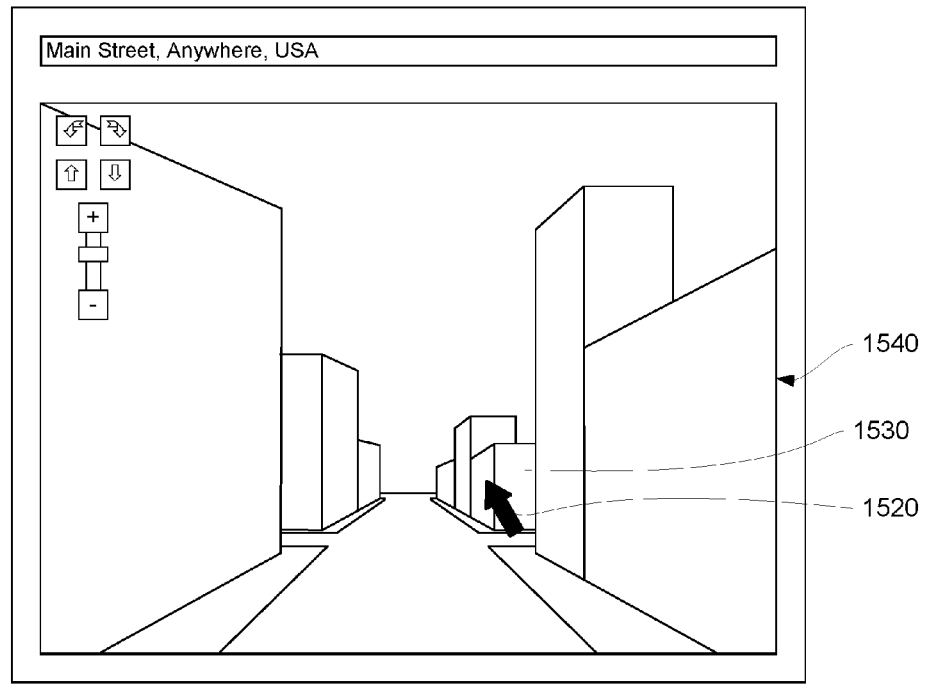
FIG. 15 is a screen shot in accordance with an aspect of the invention.

In one aspect of the system and method and as shown in FIG. 15, the user may change the location and orientation of the viewpoint by moving the mouse cursor 1520 to click on a distant geographic object, such as building 1530, in the street level image 1540 displayed by a web browser. As disclosed in U.S. patent application Ser. No. 12/038,325 (incorporated herein by reference), the street level image closest to and oriented towards the building 1530 may be retrieved from the map database.

Figure 16:
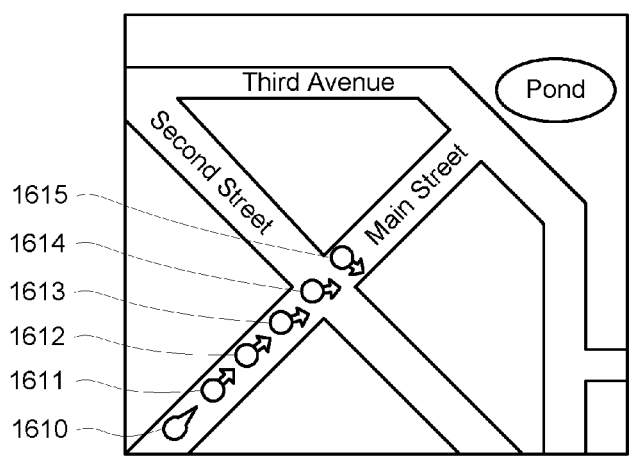
FIG. 16 illustrates intermediate locations and orientations in accordance with an aspect of the invention.

FIG. 16 illustrates an aspect whereby both the viewpoint location and viewpoint orientation change for each intermediate image. Icon 1610 identifies the location and orientation (e.g., northeast) used to display the first street level image 1540. Location/orientation 1615 represents the location and orientation (e.g., southeast) of the street level image that was retrieved from the server based on the user selecting building 1530. Based on these starting and ending locations and orientations, the processor may calculate the intermediate locations/orientations 1611-14 so as to gradually move each subsequent intermediate image closer in location and orientation to the location/orientation 1615. This may be particularly advantageous to the user because clicking a distant building in a street level image, and displaying a new street level image in response, may cause to the user to become disoriented when the camera location and/or angle change dramatically. The aspect illustrated by FIG. 16 allows the user to follow the change in location and camera angle and thus mitigates disorientation.

In one aspect, a system and method in accordance with the foregoing is used when the user is transitioning from street level images separated by relatively large distances. However, when transitioning between shorter distances such as neighboring street level images, a system and method that pans and zooms images as described in the background may be sufficient.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method of displaying a street level image comprising:
receiving, by one or more processors, a first street level image of one or more geographic objects, wherein the first street level image is a photographic image captured by a camera geographically located at a first position, and wherein each of a first plurality of pixels of the street level image represents the visual appearance of a portion of a surface of the one or more geographic objects;

receiving, by the one or more processors, depth data that associates each pixel of a second plurality of pixels with a geographic location of a surface portion whose visual appearance is represented by the pixel, each pixel of the second plurality being a member of the first plurality;

downloading a second street level image, from a computer, that was captured by a camera geographically located at a second position different from the first position;

while downloading the second street level image, the following is performed:
(1) determining, by the one or more processors, a plurality of polygons wherein each polygon includes a region of the first street level image, and wherein each vertex of each polygon is associated with (a) the pixel position of a pixel within the second plurality of pixels set of pixels and (b) based on the depth data, the geographic location of the surface whose visual appearance is represented by the pixel at the pixel position, and
(2) displaying the polygons from a vantage point of an intermediate location by altering the pixel positions of the one or more vertices of the plurality of polygons such that the surfaces of the geographic objects represented in the first image are displayed from the vantage point of the intermediate location; and providing for display, by the one or more processors, on an electronic display, the downloaded second street level image of the geographic object.

2. The method of claim 1 wherein the second position is determined based on a user's selection of a portion of the first image.

3. The method of claim 1 wherein the depth data comprises geographic distances and the geographic location of the surface associated with a pixel is determined based on the distance and the first position.

4. The method of claim 1 further comprising:
determining, by the one or more processors, a sequence of a plurality of intermediate locations, each intermediate location being closer to the second position than the prior intermediate location in the sequence; and
displaying the polygons from a vantage point of an intermediate location by altering the pixel positions of the one or more vertices of the plurality of polygons such that the surfaces of the geographic objects represented in the first image are displayed from the vantage point of the intermediate location.

5. The method of claim 4 wherein the sequence of images appears as an animation travelling through a scene of the one or more geographic objects represented in the first street level image.

6. The method of claim 1 wherein the polygons comprise triangles.

7. The method of claim 1 wherein the polygons do not overlap when positioned within the first street level image.

8. The method of claim 1, wherein the first street level image is a plurality of photographic images that have been combined with one another.

9. The method of claim 1 wherein altering the pixel positions of one or more vertices further comprises altering the size of the one or more polygons.

10. A system for displaying a street level image, the system comprising one or more processors configured to:
receive a first street level image of a geographic object, wherein the first street level image is a photographic image captured by a camera geographically located at a first position, and wherein each of a first plurality of pixels of the street level image represent the visual appearance of a portion of a surface portion of the one or more geographic objects;
receive depth data that associates each pixel of a second plurality of pixels with a geographic location of a surface whose visual appearance is represented by the pixel, each pixel of the second plurality being a member of the first plurality;
download a second street level image, from a computer, that was captured by a camera geographically located at a second position different from the first position;
while downloading the second street level image, the following is performed:
(1) determine a plurality of polygons wherein each polygon includes a region of the first street level image, and wherein each vertex of each polygon is associated with (a) the pixel position of a pixel within the second plurality of pixels and (b) based on the depth data, the geographic location of the surface whose visual appearance is represented by the pixel at the pixel position, and
(2) display the polygons from a vantage point of an intermediate location by altering the pixel positions of the one or more vertices of the plurality of polygons such that the surfaces of the geographic objects represented in the first image are displayed from the vantage point of the intermediate location; and
provide for display on an electronic display, the downloaded second street level image of the geographic object.

11. The system of claim 10, wherein the second position is determined based on a user's selection of a portion of the first image.

12. The system of claim 10, wherein the depth data comprises geographic distances and the geographic location of the surface associated with a pixel is determined based on the distance and the first position.

13. The system of claim 10, wherein the one or more processors are also configured to:
determine a sequence of a plurality of intermediate locations, each intermediate location being closer to the second position than the prior intermediate location in the sequence; and
display the polygons from a vantage point of an intermediate location by altering the pixel positions of the one or more vertices of the plurality of polygons such that the surfaces of the geographic objects represented in the first image are displayed from the vantage point of the intermediate location.

14. The system of claim 13, wherein the sequence of images appears as an animation travelling through a scene of the one or more geographic objects represented in the first street level image.

15. The system of claim 9 wherein the polygons do not overlap when positioned within the first street level image.

16. A non-transitory, tangible computer-readable medium on which instructions are stored, the instructions, when executed by one or more processors, causes the one or more processors to perform a method for displaying a street level image, the method comprising:

receiving a first street level image of one or more geographic objects, wherein the first street level image is a photographic image captured by a camera geographically located at a first position, and wherein each of a first plurality of pixels of the street level image represent the visual appearance of a portion of a surface portion of the one or more geographic objects;

receiving depth data that associates each pixel of a second plurality of pixels with a geographic location of a surface whose visual appearance is represented by the pixel, each pixel of the second plurality being a member of the first plurality;

downloading a second street level image, from a computer, that was captured by a camera geographically located at a second position different from the first position;

while downloading the second street level image, the following is performed:

(1) determining, by the one or more processors, a plurality of polygons wherein each polygon includes a region of the first street level image, and wherein each vertex of each polygon is associated with (a) the pixel position of a pixel within the second plurality of pixels and (b) based on the depth data, the geographic location of the surface whose visual appearance is represented by the pixel at the pixel position, and (2) displaying the polygons from a vantage point of an intermediate location by altering the pixel positions of the one or more vertices of the plurality of polygons such that the surfaces of the geographic objects represented in the first image are displayed from the vantage point of the intermediate location; and providing for display on an electronic display, the downloaded second street level image of the geographic object.

17. The medium of claim 16, wherein the second position is determined based on a user's selection of a portion of the first image.

18. The medium of claim 16, wherein the depth data comprises geographic distances and the geographic location of the surface associated with a pixel is determined based on the distance and the first position.

19. The medium of claim 16, wherein the instructions, when executed by the one or more processors, also causes the one or more processors to perform the following:

determine a sequence of a plurality of intermediate locations, each intermediate location being closer to the second position than the prior intermediate location in the sequence; and displaying the polygons from a vantage point of an intermediate location by altering the pixel positions of the one or more vertices of the plurality of polygons such that the surfaces of the geographic objects represented in the first image are displayed from the vantage point of the intermediate location.

20. The medium of claim 19, wherein the sequence of images appears as an animation travelling through a scene of the one or more geographic objects represented in the first street level image.

21. The medium of claim 16 wherein the polygons do not overlap when positioned within the first street level image.

* * * * *